United States Patent
Shaked et al.

(10) Patent No.: US 10,685,448 B2
(45) Date of Patent: Jun. 16, 2020

(54) OPTICAL MODULE AND A METHOD FOR OBJECTS' TRACKING UNDER POOR LIGHT CONDITIONS

(71) Applicant: INUITIVE LTD., Ra'anana (IL)

(72) Inventors: Yaniv Shaked, Binyamina (IL); Hassid Costa Gurgov, Or Akiva (IL)

(73) Assignee: INUITIVE LTD., Ra'anana (IL)

( * ) Notice: Subject to any disclaimer, the term of this patent is extended or adjusted under 35 U.S.C. 154(b) by 123 days.

(21) Appl. No.: 16/010,707

(22) Filed: Jun. 18, 2018

(65) Prior Publication Data

US 2018/0365840 A1    Dec. 20, 2018

Related U.S. Application Data

(60) Provisional application No. 62/521,574, filed on Jun. 19, 2017.

(51) Int. Cl.
*G06T 7/20* (2017.01)
*G01C 21/20* (2006.01)
*G02B 27/00* (2006.01)
*G01C 21/12* (2006.01)
*G02B 27/01* (2006.01)
*G02B 26/10* (2006.01)

(52) U.S. Cl.
CPC ............... *G06T 7/20* (2013.01); *G01C 21/20* (2013.01); *G02B 27/0093* (2013.01); *G01C 21/12* (2013.01); *G02B 26/103* (2013.01); *G02B 26/105* (2013.01); *G02B 27/017* (2013.01); *G02B 2027/0138* (2013.01); *G02B 2027/0187* (2013.01); *G06T 2207/10048* (2013.01); *G06T 2207/10152* (2013.01); *G06T 2207/30241* (2013.01)

(58) Field of Classification Search
CPC ............. G06T 7/20; G06T 2207/10152; G06T 2207/30241; G06T 2207/10048; G01C 21/20; G01C 21/12; G02B 27/0093; G02B 2027/0187; G02B 27/017; G02B 26/103; G02B 26/105; G02B 2027/0138
See application file for complete search history.

(56) References Cited

U.S. PATENT DOCUMENTS

| | | | |
|---|---|---|---|
| 2016/0309134 A1* | 10/2016 | Venkataraman | H04N 13/243 |
| 2017/0052070 A1* | 2/2017 | Marsh | G06K 9/00671 |
| 2018/0182117 A1* | 6/2018 | Goldentouch | G06T 7/593 |
| 2018/0307238 A1* | 10/2018 | Wisniowski | B60W 30/00 |
| 2018/0357670 A1* | 12/2018 | DeLuca | G06Q 30/0255 |

* cited by examiner

*Primary Examiner* — Neil R McLean
(74) *Attorney, Agent, or Firm* — Browdy and Neimark, PLLC

(57) ABSTRACT

An optical module and a method for its used are provided. The optical module comprises: an image capturing device; an illuminating device; a position measurement unit and a processor configured to: a) identify objects included in at least one frame that has been captured by the image capturing device; b) determine position of the one or more identified objects based on data received from the position measurement unit; and c) control operation of the at least one illuminating device while capturing a new image, to illuminate only part of the field of view of the target being acquired by the at least one image capturing device, wherein the one or more identified objects are included.

8 Claims, 3 Drawing Sheets

OPTICAL MODULE AND A METHOD FOR OBJECTS' TRACKING UNDER POOR LIGHT CONDITIONS

TECHNICAL FIELD

The present disclosure generally relates to the field of illumination, and more particularly, to illumination of objects under widely varying conditions.

BACKGROUND

In many cases, it is very important for the system being used to identify its own position and orientation in space. For a solid object, position and orientation have for example the following 6 Degrees Of Freedom ("DOF"): translation (x, y, z) and rotation (yaw, pitch, roll). These six DOF may be defined relatively to a first position measured in time (or relatively to earth by using GPS).

There are various methods that are designed to enable a system finding its own 6 DOF in time, while moving the system in order to find its 6 DOF. One such method is by using a camera for capturing sequential frames and then analyze the differences between the frames, in order to retrieve the camera shift that occurred between the frames taken and aggregate those shifts in order to determine a current position relative to the initial position.

Another option is to use an Inertial Measurement Unit ("IMU") which includes accelerometers, gyros and magnetic compass, in order to measure the system's movement. Moreover, it is possible to use a combination that comprises one or a few cameras and one or a few IMUs, in order to improve the accuracy of the position detection.

Various applications require the use of such systems. For example, Augmented Reality (AR) and Virtual Reality (VR), in which a system is located on top of the user's head for measuring the movements of the user's head, where movements are defined as translation and/or rotation.

In the case of Augmented Reality, knowledge about the exact head position enables rendering an artificial object within the world around the user. In this scenario, one can mount a device on one's head, e.g. in the form of AR glasses, and the device would display an object onto the AR glasses. In order to simulate a real object in the world that remains at the same position, being independent of different head positions, the device requires the knowledge of the head position. If, for example, the head is turned to left, the augmented object should be moved to a right position from its previous location at the AR glasses, whereas if the head is turned to the right, the augmented object should be moved to a left position from its previous location at the AR glasses.

For the case of Virtual Reality, in order to avoid nausea and sickness, one should measure the head movement and render a virtual world relative to the head position, in a way that the world changes essentially according to the user's head movements.

Another example for such an application can be a 3D reconstruction, in which the user can scan an object from different angles and create a 3D model of the object from these scanning results. One can use a camera of a mobile phone or a drone in order to scan small or big objects. Knowing the exact camera position in such applications enables retrieving data from the different images obtained and aggregate it into one exact 3D model.

Under poor light conditions, the above-described systems can operate within the Infra-Red (IR) spectrum, by illuminating the environment with an IR projector that does not interfere with the human eye, yet enable an IR camera to view the environment, and the system to determine its position by analyzing the shift occurring between the frames captured by the IR camera. Using depth cameras is also common in such cases, because depth cameras may provide the exact 3D position of the respective objects in the world.

All of the above applications can be in the form of embedded solutions, where the power supply is a battery. In these cases of operating under a dark environment, where the IR projector might consume most of the battery power, reducing its power consumption is a factor that has a critical effect on the systems' ability to function for a long period of time.

The typical prior art solutions for this matter are either using RGB cameras having no projectors which do not function satisfactorily under poor light conditions, or using a projector while capturing all images, resulting in a high-power consumption. Still, in order to reduce power consumption in these systems, one may reduce the frame rate of the images being captured in the attempt to rely extensively on extracting the camera's position from IMU readings. Reducing the frame rate is required to allow increasing the integration time (per frame), in order to get reasonably decent signals under poor light conditions. This in turn leads to smeared images, and consequently reduction of SLAM precision and increase SLAM sensing latency.

The term "SLAM" as used herein stands for Simultaneous Localization and Mapping. Localization relates to finding the current camera position. Mapping refers to saving the positions of objects in a scene so that when one returns to the same scene, he/she would not have to scan the whole scene again and instead will be able to retrieve objects' location from a database (a map of the scene that was saved).

The present invention seeks to provide a solution that will reduce power consumption when operating under poor light conditions while overcoming the problems described above, thereby enabling such systems to operate for longer periods of time.

SUMMARY OF THE DISCLOSURE

The disclosure may be summarized by referring to the appended claims.

It is an object of the present disclosure to provide a method for reducing power consumption of an optical module, and an optical module implementing this method.

It is another object of the present disclosure to provide a method and a module that enable object tracking under poor light conditions.

It is still another object of the present disclosure to provide an optical module that can be incorporated in mobile devices and/or consumer-electronics' devices, and improve their power consumption.

Other objects of the present invention will become apparent from the following description.

According to an embodiment of the disclosure, there is provided an optical module comprising:
  at least one image capturing device (e.g. a camera);
  at least one illuminating device;
  at least one position measurement unit; and
  at least one processor configured to:
  identify one or more objects included in at least one frame that has been captured by the at least one image capturing devices;
  determine expected position of the one or more identified objects based on data received from the at least one position measurement unit; and control operation of the at least one illuminating device while capturing a new image, to illuminate only part of the field of view of the target being acquired by the at least one image capturing device, wherein the one or more identified objects are included.

The term "object" as used herein throughout the specification and claims should be understood to encompass also one or more features associated with an object and/or part of an object, that comprise at least one identifiable pattern. Such an object is included within an image of a target captured by one or more image capturing devices.

According to another embodiment, at least one of the at least one image capturing device and at least one of said at least one illuminating device, are operative in the IR range.

In accordance with another embodiment, the at least one processor is configured to determine the expected position of the one or more identified objects based on relative movement that occurs between the optical module and the target being acquired by the at least one image capturing device.

According to still another embodiment, the part of the field of view of the target being acquired comprises a number of separated sub parts, each encompassing at least one of the identified objects.

By yet another embodiment, in case of poor light conditions, the at least one illuminating device is configured to operate in accordance with at least one of the following methods:
  a) to illuminate the whole FOV for one or more frames, until a sufficient number of objects has been acquired for tracking;
  b) to illuminate the whole FOV with an intensity being increased in each consecutive frame, until a sufficient number of objects has been acquired for tracking; or
  c) to illuminate a different part of the FOV in proceeding frames.

If an object of interest is detected in the illuminated part, it would preferably be added to the current set of objects being tracked and will be illuminated and tracked within the next captured image (e.g. the next frame).

According to another aspect of the present disclosure, there is provided a method for capturing an image under poor light conditions, by an optical module comprising at least one image capturing device, at least one image capturing device, at least one IR illuminating device and at least one position measurement unit, said method comprising the steps of:
  selecting one or more objects included in a current image captured by the at least one of the at least one image capturing device, to be objects of interest;
  matching the one or more selected objects with corresponding objects included in one or more preceding images (e.g. previous frames) and determining an initial set of objects to be illuminated by the at least one IR illuminating device;
  illuminating by the at least one IR illuminating device, one or more areas included in the target field of view but less than the whole field of view, wherein the objects belonging to the initial set of objects are located within the one or more illuminated areas; and
  determining position of an expected target FOV relatively to the optical module position, in order to IR illuminate objects in one or more proceeding images (e.g. proceeding frames);
  thereby allowing reduction of power required for capturing images of a target under poor light conditions, by illuminating only part of its field of view (FOV) with the at least one IR illuminating device.

According to another embodiment of this aspect, the method provided further comprises a step of applying one or more pre-determined criteria in order to determine whether objects that were IR illuminated while capturing the current image, will be IR illuminated when the next image (frame) will be captured and/or whether additional objects included in the currently captured image should be IR illuminated when the next image will be captured.

In accordance with another embodiment, the step of matching the one or more selected objects with corresponding objects is carried out based on descriptors created for the objects by the optical module and/or based on spatial relative location of the objects.

By yet another embodiment, the step of determining the expected position of the object in an image capturing device's FOV, is when the image of a target is acquired, and wherein the expected position is determined relatively to the optical module position based on the optical module's position when capturing the previous frame and from the optical module's shift as retrieved from translation/rotation measured by the at least one position measurement unit till the time at which the current image is captured.

In accordance with another embodiment, the step of determining the position of an expected target FOV relative to the optical module position is further based upon measuring relative objects' distances from the optical module. Optionally, measuring relative distance of an object from the optical module is based on at least one member of the group that consists of: a) carrying out a triangulation process for the object when data is retrieved from different frames; b) using a stereo vision device; c) measuring a time period that extends between sending a laser beam to the object's position and the time at which the returned beam is received (i.e. using Time of Flight (ToF) technology).

By yet another embodiment, the step of determining the initial set of objects to be illuminated by the at least one IR illuminating device, is based upon data received while illuminating the target FOV with the at least one IR illuminating device in accordance with one or more methods being members of a group the consists of:
  a) illuminating the whole target FOV while capturing one or more images (frames) until a sufficient number of objects are acquired for the initial set of objects;
  b) illuminating the whole target FOV with an intensity that is increased in each consecutive captured image relative to the preceding one, until a sufficient number of objects are acquired for the initial set of objects;
  c) illuminating a different part of the FOV in each proceeding image that is captured (for example in a raster-scan arrangement).

According to still another embodiment the one or more pre-determined criteria are members selected from a group that consists of: a) morphological contrast relative to the object's surroundings, b) relative location of an object to other objects included in that captured image, c) how often does an object appear in consecutively captured images, and any combination thereof.

BRIEF DESCRIPTION OF THE DRAWINGS

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein or recited in the claims.

In the following description, for the purposes of explanation, numerous specific details are set forth in order to provide a better understanding of the present invention by way of examples. It should be apparent, however, that the present invention may be practiced without these specific details.

Figure 1:
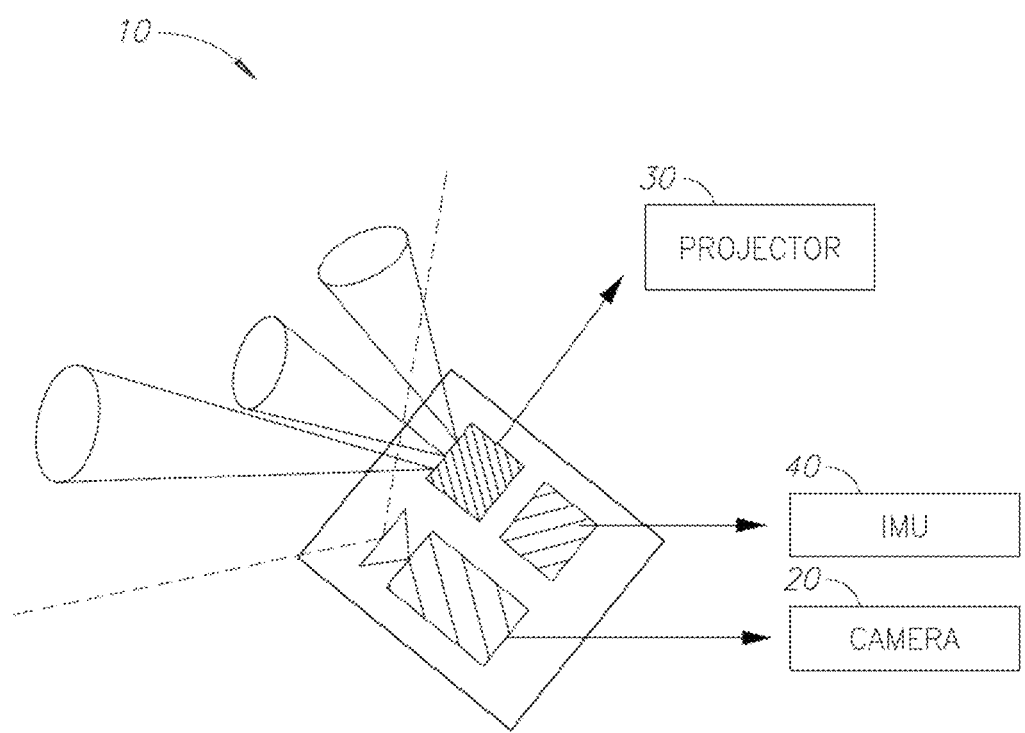
FIG. 1—illustrates an example of an optical module construed in accordance with an embodiment of the present invention.

FIG. 1 illustrates an optical module 10, which may be included within a system such as an AR system (e.g. AR glasses), a VR system (e.g. VR glasses) or in a 3D reconstruction system, construed in accordance with an embodiment of the present invention. Optical module 10 comprises at least one camera (20) being able to operate also in the IR spectrum, at least one illuminating device (30) (e.g. a projector) that is operative in the IR range and at least one position measurement unit (40) such as an IMU (Inertial Measurement Unit), or an optical gyroscope, and the like. This optical module is configured to enable tracking of objects under all-ambient illumination conditions.

Under poor light conditions, the at least one illuminating device (30) is configured to illuminate only small areas of interest of the field of view (FOV) rather than the complete field of view.

During its operation under such poor light conditions, a processor fitted within the optical module (not shown in this FIG.), is configured to select a set of objects that are included in the images being captured by the camera and elect them to be objects of interest. Such objects can be for example keypoints (like corners, stationary points, etc.) comprised in the images, straight lines, edges or symbols.

Figure 2:
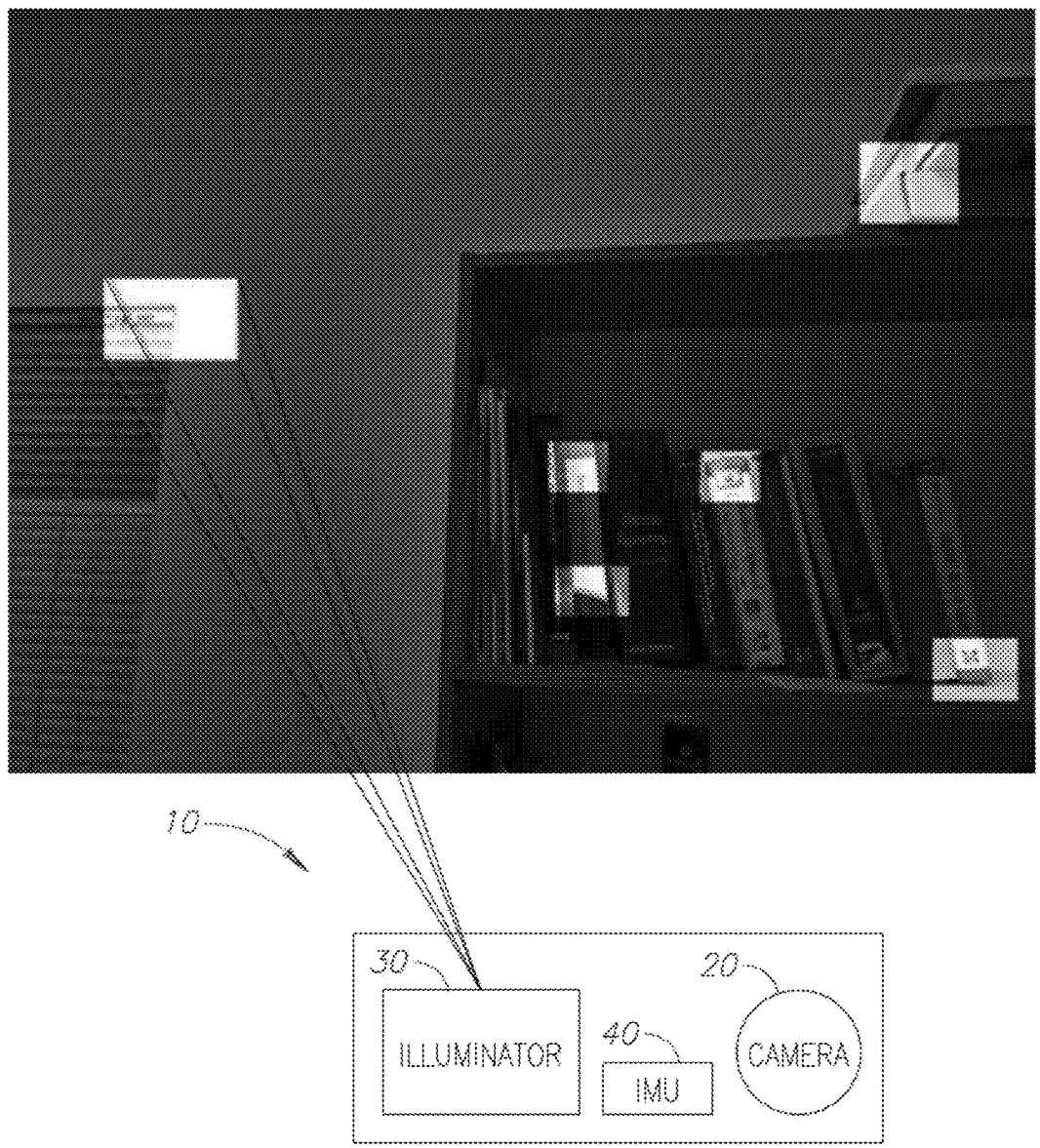
FIG. 2—exemplifies an image where certain selected keypoints are illuminated.

FIG. 2 exemplifies an image where certain selected keypoints are illuminated according to the method provided by the present invention. The processor is preferably configured to detect certain objects within a current frame, to select one or more objects from among the detected objects and then to match the selected one or more objects with their corresponding objects that are included in one or more preceding (time-wise) frames. Consequently, the optical module is able to enable tracking of objects between captured frames. Matching objects may be done for example based on descriptors created for them by the system and/or based on spatial relative location of the objects.

Preferably, the objects in an acquired scene remain steady when estimating the camera (the image capturing device) position. If the objects move in front of the camera, the calculation of the new camera position might be erroneous. If only a single camera is used, and the whole scene is moving in front camera, one is not likely to recognize whether the camera is moving or the scene is moving. The IMU in this case would be of help, as it predicts the camera movement if the object is not found at the predicted location. Thus, it is preferred not to use a moving object for estimating the camera's movement.

In order to initialize such an object detection and tracking process in case of poor light conditions (i.e. insufficient illumination for object detection), the scene may be illuminated by adopting any one or more of the following methods:
  a) Illuminating the whole FOV for one or more frames until enough objects have been acquired;
  b) Illuminating the whole FOV with an increasing intensity, where the intensity is sequentially increased in each frame until a sufficient number of objects has been acquired for tracking; or
  c) Illuminating a different part of the FOV in each next frame (for example in a raster-scan arrangement). In the case that a new object is detected within the illuminated part (e.g. the illuminated spot), it would be added to the tracked set of objects and will be illuminated and tracked in the next captured image (frame), and while capturing that next image, one or more additional FOV parts may preferably be illuminated, to enable detecting additional objects of interest.

It should be noted that in all of the methods described-above, the illumination should preferably take place when the camera captures an image (and possibly also when it is just about to capture an image). The illumination intensity may remain constant during the camera's exposure (i.e. when the camera captures the image), but optionally its intensity may be changed once or even a number of times, during that period of time, e.g. the illumination may skip from one FOV area to another, during the camera's exposure.

This solution is very useful for devices such mobile devices and/or consumer-electronics' devices, where the illuminating device is their typical main power consumer, and by following the solution provided by the present invention, this power consumption may be significantly reduced.

After acquiring the initial set of objects, the illuminating device (e.g. the illumination module) illuminates only areas in the field of view where the tracked objects are expected to be found. The expected position of the tracked objects relative to the device is derived from the device's position when capturing the previous frame and from the device's shift retrieved from translation/rotation measured by the IMU till the time at which the current frame has been captured and possibly based also on the objects' distances from the optical module. It should be noted that if the illuminating module is located much closer to the camera relative to its distance to the object, then depth information may not be required. Typically, depth information may be used for correcting the illumination angle relative to camera. The object's distance from the device (depth measurement) can be derived from triangulating the same object as retrieved from different captured images or by using stereo vision, or by measuring a period time between sending a laser beam to the object's position and the time at which the returned beam was received (i.e. using Time of Flight (ToF) technology).

It should be noted that if one were to rely only on IMU readings, it is likely that a drift in position estimation would be experienced after about 1-2 seconds from the beginning of its measurements. Therefore, when the position measurement unit is an IMU, it can be very useful in predicting movement between each pair of consecutive frames (e.g. having a period of time of about milliseconds therebetween). Based on the results obtained therefrom, the predicted object (keypoint) locations may be illuminated and the objects' precise location in the image may be derived therefrom. By using a precise location of the observed objects, it is possible to calculate the precise camera movement. In other words, the IMU is able to provide a good approximation of the camera movement which may be followed by determining the objects precise locations in the image.

Therefore, the IMU may preferably be used in predicting new positions of objects in the new frame, and after illuminating the areas associated therewith and finding the exact positions of the objects in that frame, one may further calculate from this finding, the exact camera movement and the new location, (e.g. by finding the homography matrix between those frames).

Let us consider for example a case of AR application, where the screen is rendered at least 90 Hz, the exact camera position should be known every 10 ms. However, the camera's image is usually captured at a rate of 60 Hz or less, i.e. every 16 ms, whereas the IMU readings may be at a rate of every 5 ms, or every 1 ms or even less than that. Therefore, IMU readings may be used according to the present invention to provide an estimate for the camera position between every pair of two consecutive frames.

The term "homography matrix" as used herein is used to denote the case where a pixel is taken from the previous frame and multiplied by the homography matrix, to obtain its location in the new frame. There are certain mathematical methods that are known in the art per se in order to find this matrix, if the positions of the same objects in both frames are known.

Locations of the illuminated areas in the field of view, are selected according to the objects being tracked. For each new frame, tracking or discarding of an object is carried out according to one or more pre-defined criteria (i.e. a score associated with the object). A pre-defined criterion may be for example any one the following ones:

(i) Structure—seeking morphological contrast relative to the object's surroundings.
(ii) Relative location to the other objects included in the frame—seeking a set of objects as spread across different locations in the frame.
(iii) Repeatability—an object that consistently appears across previous frames.

Each illuminated area size is determined by the expected accuracy measurement of the IMU and depth measurement if available. If an object is not found within a new frame, the optical module may choose to enlarge the searching area size for this object.

If part, or all, of the FOV consists of new areas, while making the analysis discussed above, the processor may preferably consider these areas at the same way as done during the initial stage, in order to try and find new suitable objects that are included in these areas.

There is a number of methods that may be used for illuminating the scene in an addressable manner which enable the above disclosed poor light SLAM sensing, among which are:

Scanning Beam
A scanning beam in a raster scan (i.e. the rectangular pattern of image captured and reconstructed) or in another arrangement, is a beam that passes FOV area detected as an object, and the beam's intensity is increased to a required level, thereby, enabling an optimal SNR for object tracking.

Scanning methods:
a. Use of MEMS deflecting mirror, where the light beam is incident on a micro-mirror which is part of a scanning MEMS device, or the beam is refracted by two or more rotating prisms which comprise the MEMS device.
b. Use of an acousto-optic scanner, where the beam passes through one or more acousto-optic cells, deflects the beam to a direction which rapidly changes in time according to the signals applied to the acousto-optic cells.
c. Use of an electro-optic device, wherein the electro-optic effect enables the deflection of light beam according to the voltage provided to the device.
d. Use of a scanning fiber, where a fiber light source is controlled by flexing its tip so that its direction changes in time.

Addressable Light Source Array
According to this method, each light source in the array is directed to a different area of the FOV, and together they form a continuous illuminating source of the complete FOV. For instance, such an array may comprise a VCSEL or a LED array, and one or more optical components direct the beam emitted from each light source in the array towards its corresponding direction in the FOV. Optical components may be uniform micro-lens array (MLA) followed by a negative lens, or MLA followed by a Fresnel lens, or an MLA with lenslets whose shape includes a prism that deflects each the beam emitted from each light source to its destination.

Spatial Light Modulator
A modulator may be of a phase type or an intensity type which, when illuminated creates light patterns across the FOV to match the illumination locations of interest.

For each of the optical arrangements described hereinabove, the light forwarded to a certain FOV area is preferably controlled so as to provide an optimal SNR of the object image, and consequently a reliable object tracking. Furthermore, it may be such as to compensate for background (ambient) illumination, distance to the object, its reflectivity as well as any other applicable factors.

Figure 3:
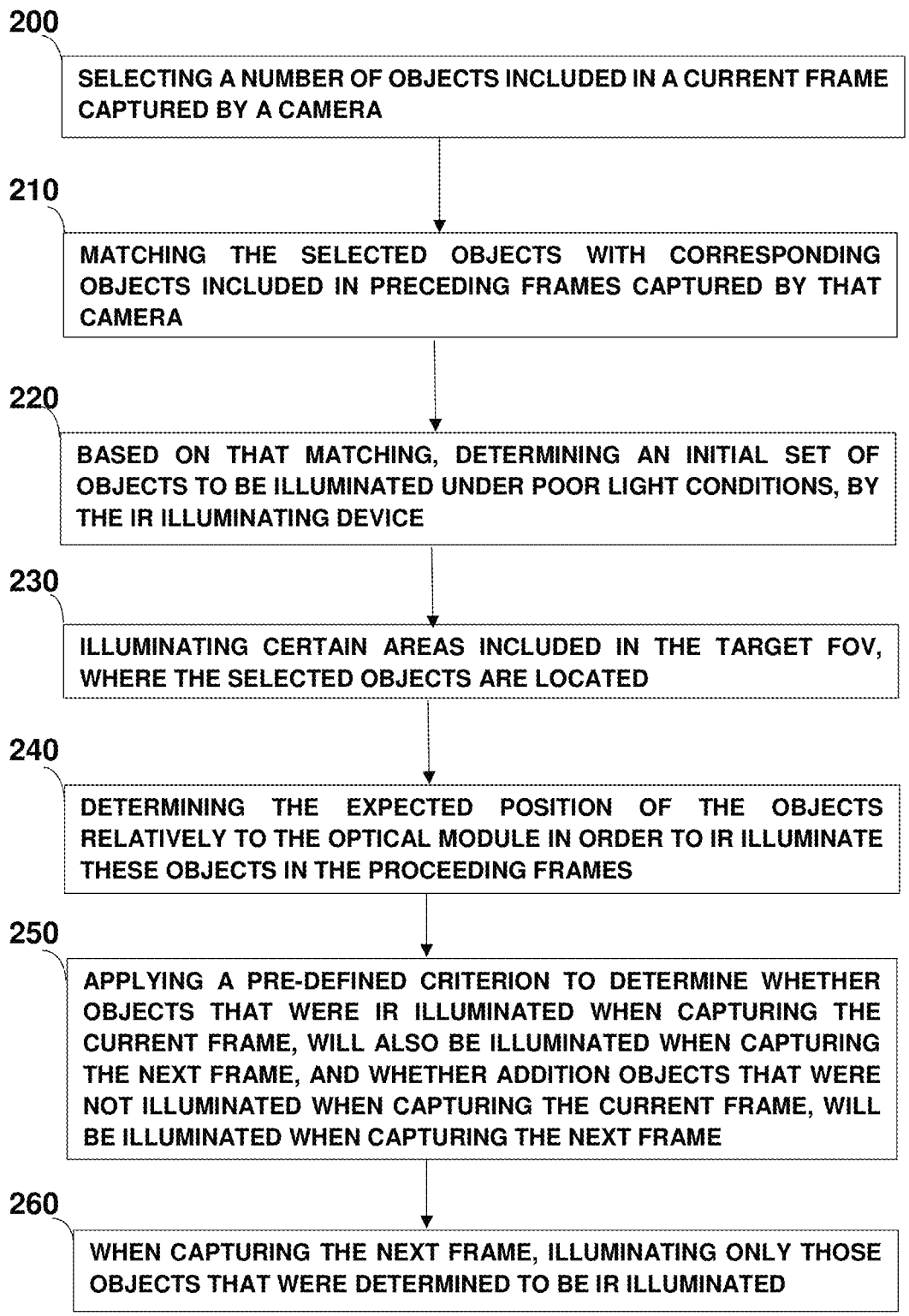
FIG. 3—presents a flow chart, illustrating a method of carrying out an embodiment of the present invention.

FIG. 3 presents a flow chart, illustrating a method for capturing images under poor light conditions in accordance with an embodiment of the present invention. To do that, an optical module (or a device, apparatus, system, etc.) comprising at least one image capturing device, at least one IR illuminating device and at least one position measurement unit (e.g. an IMU). According to the method exemplified herein, a number of objects are selected. These objects are included in a current frame captured by the at least one of the at least one image capturing device (step 200).

The selected objects are then matched with corresponding objects that are included in one or more preceding frames (step 210) captured by that at least one image capturing device, and an initial set of objects to be illuminated by the at least one IR illuminating device is then determined (step 220).

Next, one or more areas included in the target field of view (but in less than the whole field of view) are illuminated by the at least one IR illuminator (step 230), wherein the selected objects are located within the one or more illuminated areas.

Then, the expected position of the objects to be illuminated is determined relatively to the optical module position (step 240), in order to enable IR illuminating of these objects in proceeding frames.

Next, one or more pre-determined criteria are applied (step 250) in order to determine whether objects that were IR illuminated while capturing the current image, will be IR illuminated when the next image will be captured and/or whether additional objects included in the currently captured image should be IR illuminated when the next image will be captured. When capturing a proceeding image, only those objects that were determined to be IR illuminated (based on their score when the pre-defined criterion was applied to each of the objects) (step 260).

Consequently, by illuminating only part of the target field of view (FOV) with the IR illuminating device, the power required for capturing images of a target under poor light conditions, is substantially less than the power that would have been required if this solution is not implemented.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different objects, not all of which are required in all embodiments of the invention. Some embodiments of the present invention utilize only some of the objects or possible combinations of the objects. Variations of embodiments of the present invention that are described and embodiments of the present invention comprising different combinations of features noted in the described embodiments will occur to persons of the art. The scope of the invention is limited only by the following claims.

The invention claimed is:

1. An optical module comprising:
at least one image capturing device;
at least one illuminating device;
at least one position measurement unit; and
at least one processor configured to:
  identify one or more objects included in at least one frame that has been captured by the at least one image capturing device;
  determine expected position of the one or more identified objects based on data received from the at least one position measurement unit; and
  control operation of the at least one illuminating device while capturing a new image, to illuminate only part of the field of view (FOV) of the target being acquired by the at least one image capturing device, wherein the one or more identified objects are included,
wherein in case of poor light conditions, the at least one illuminating device is configured to operate in accordance with at least one of the following:
a) to illuminate the whole FOV for one or more frames until a sufficient number of objects has been acquired for tracking;
b) to illuminate the whole FOV with increasing intensity in each frame until a sufficient number of objects has been acquired for tracking; or
c) to illuminate a different part of the FOV in proceeding captured images.

2. A method for capturing an image under poor light conditions, by an optical module comprising at least one image capturing device, at least one Infra-Red (IR) illuminating device and at least one position measurement unit, said method comprising the steps of:
selecting one or more objects included in a current image captured by the at least one of the at least one image capturing device, to be objects of interest;
matching the one or more selected objects with corresponding objects included in one or more preceding images and determining an initial set of objects to be illuminated by the at least one IR illuminating device;
illuminating by the at least one IR illuminating device, one or more areas included in a target field of view (FOV) but less than a whole FOV, wherein the objects belonging to the initial set of objects are located within said one or more illuminated areas; and
determining position of an expected target FOV relatively to the optical module position, in order to IR illuminate objects in one or more proceeding images,
thereby reducing power required for capturing images of a target under poor light conditions, by illuminating only part of its field of view with the at least one IR illuminating device, and
wherein said method further comprising a step of applying one or more pre-determined criteria in order to determine whether objects that were IR illuminated while capturing a current image, will be IR illuminated when the next image will be captured and/or whether additional objects included in the currently captured image should be IR illuminated when the next image will be captured.

3. The method of claim 2, wherein the one or more pre-determined criteria are members selected from a group that consists of: a) morphological contrast relative to the object's surroundings, b) relative location of an object to other objects included in that captured image, and c) how often does an object appear in consecutively captured images.

4. A method for capturing an image under poor light conditions, by an optical module comprising at least one image capturing device, at least one Infra-Red (IR) illuminating device and at least one position measurement unit, said method comprising the steps of:
selecting one or more objects included in a current image captured by the at least one of the at least one image capturing device, to be objects of interest;
matching the one or more selected objects with corresponding objects included in one or more preceding images and determining an initial set of objects to be illuminated by the at least one IR illuminating device;
illuminating by the at least one IR illuminating device, one or more areas included in a target field of view (FOV) but less than a whole FOV, wherein the objects belonging to the initial set of objects are located within said one or more illuminated areas; and
determining position of an expected target FOV relatively to the optical module position, in order to IR illuminate objects in one or more proceeding images,
thereby reducing power required for capturing images of a target under poor light conditions, by illuminating only part of its FOV with the at least one IR illuminating device, and
wherein the step of matching the one or more selected objects with corresponding objects is carried out based on descriptors created for said objects by the optical module and/or based on spatial relative location of said objects.

5. A method for capturing an image under poor light conditions, by an optical module comprising at least one image capturing device, at least one Infra-Red (IR) illuminating device and at least one position measurement unit, said method comprising the steps of:
selecting one or more objects included in a current image captured by the at least one of the at least one image capturing device, to be objects of interest;

matching the one or more selected objects with corresponding objects included in one or more preceding images and determining an initial set of objects to be illuminated by the at least one IR illuminating device;

illuminating by the at least one IR illuminating device, one or more areas included in a target field of view (FOV) but less than a whole FOV, wherein the objects belonging to the initial set of objects are located within said one or more illuminated areas; and determining position of an expected target FOV relatively to the optical module position, in order to IR illuminate objects in one or more proceeding images, thereby reducing power required for capturing images of a target under poor light conditions, by illuminating only part of its FOV with the at least one IR illuminating device, and wherein the step of determining the position of an expected target relatively to the optical module position is based on the position of the optical module when capturing the previous frame and from the optical module's shift retrieved from translation/rotation measured by the at least one position measurement unit till the time at which current frame is captured.

6. The method of claim 5, wherein the step of determining the position of an expected target FOV relatively to the optical module position is further based upon measuring relative objects' distances from the optical module.

7. The method of claim 6, wherein measuring relative distance of an object from the optical module is based on at least one member of the group that consists of: a) carrying out a triangulation process for said object when data is taken from different frames; b) using a stereo vision device; c) measuring a time period the extends from sending a laser beam to said object's position till the time at which the returned beam is received.

8. A method for capturing an image under poor light conditions, by an optical module comprising at least one image capturing device, at least one Infra-Red (IR) illuminating device and at least one position measurement unit, said method comprising the steps of:

selecting one or more objects included in a current image captured by the at least one of the at least one image capturing device, to be objects of interest;

matching the one or more selected objects with corresponding objects included in one or more preceding images and determining an initial set of objects to be illuminated by the at least one IR illuminating device;

illuminating by the at least one IR illuminating device, one or more areas included in a target field of view (FOV) but less than a whole FOV, wherein the objects belonging to the initial set of objects are located within said one or more illuminated areas; and determining position of an expected target FOV relatively to the optical module position, in order to IR illuminate objects in one or more proceeding images, thereby reducing power required for capturing images of a target under poor light conditions, by illuminating only part of its FOV with the at least one IR illuminating device, and wherein the step determining the initial set of objects to be illuminated by the at least one IR illuminating device is based upon data received while illuminating the target FOV with the at least one IR illuminating device in accordance with one or more methods being members of a group the consists of:
  i) illuminating the whole target FOV while capturing one or more images until a sufficient number of objects are acquired for the initial set of objects;
  ii) illuminating the whole target FOV with increasing intensity in each consecutive captured image, until a sufficient number of objects are acquired for the initial set of objects;
  iii) illuminating a different part of the FOV in each proceeding image that is captured.

* * * * *